United States Patent [19]

Mutch

[11] Patent Number: 5,101,621

[45] Date of Patent: Apr. 7, 1992

[54] INTEGRATED CORNER FOR DUCTED FAN ENGINE SHROUDS

[75] Inventor: Henry Mutch, Chula Vista, Calif.

[73] Assignee: Rohr Industries, Inc., Chula Vista, Calif.

[21] Appl. No.: 411,991

[22] Filed: Sep. 25, 1989

[51] Int. Cl.⁵ .............................. F02K 3/02; B32B 3/12
[52] U.S. Cl. .................................. 60/226.1; 428/116
[58] Field of Search ................ 428/116; 244/119, 123; 60/226.1, 39.31

[56] References Cited

U.S. PATENT DOCUMENTS

| | | | |
|---|---|---|---|
| 3,301,732 | 1/1967 | Kunz | 428/116 |
| 3,890,108 | 6/1975 | Welsh | 428/116 |
| 4,825,648 | 5/1989 | Adamson | 60/226.1 |
| 4,826,106 | 5/1989 | Anderson | 428/116 |
| 4,917,747 | 4/1990 | Chin et al. | 428/116 |

Primary Examiner—Louis J. Casaregola
Assistant Examiner—John A. Savio, III
Attorney, Agent, or Firm—Patrick J. Schlesinger; Frank D. Gilliam

[57] ABSTRACT

An engine shroud with integral honeycomb panel corners for use in the thrust reverser region of ducted fan gas turbine engines. The integral shroud is useful in a turbine engine having a core engine surrounded by an engine casing and nacelle, with a fan at the inlet directing air flow into the bypass duct between core engine and engine nacelle. The shroud basically consists of right and left ducts each having an approximately semicircular cross-section with radial flanges extending from the duct edges. The flanges permit the halves to be fastened together to produce a tubular shroud adapted to surround a gas turbine engine and form the inner wall of a bypass duct. The disclosed shroud eliminates the prior complex corner fittings connecting the semicircular center portion of the shroud to the extending flanges and provides simple, integral corners.

3 Claims, 3 Drawing Sheets

INTEGRATED CORNER FOR DUCTED FAN ENGINE SHROUDS

BACKGROUND OF THE INVENTION

This invention relates in general to engine shrouds for gas turbine engines and, more specifically, to an improved shroud having integral corners.

Ducted fan jet engines for aircraft applications have come into widespread use. Such engines include a core engine within a streamlined shroud, a stage of fan blades mounted upstream of the engine and driven thereby, and a nacelle surrounding the fan blades and shroud and spaced from the shroud to provide a bypass duct between nacelle and shroud through which compressed air is forced by the fan blades.

The shroud which surrounds the engine and forms both the housing for the engine and the interior wall of the bypass duct is often formed from two halves which are fastened together to form the shroud. This arrangement facilitates engine servicing, removal and reinstallation. Each shroud half consists of a center section having a generally semicircular cross-section which forms half of the tubular shroud around the engiee and two radially extending flanges attached to the edges of the each center section to aid in supporting the shroud within the engine casing and nacelle and to carry means for securing the shroud halves together.

The intersection between flanges and center section is a rather sharp corner, which could not be formed directly in the generally used shroud materials. The shroud is ordinarily fabricated from a panel which comprises a honeycomb core to which two face sheets are bonded. The panel is generally formed from a metal such as aluminum or high strength fiber reinforced resin matrix materials such as graphite fibers in an epoxy resin matrix. The corners between flanges and center section have in the past been made by fastening separate panels together with a variety of clamping and fastening fixtures.

While the prior corner fasteners have been effective, they are cumbersome, heavy, require considerable skill to install and are more expensive and less reliable than a continuous integral panel would be. Thus, there is a continuing need by for shrouds formed as a continuous panel, eliminating corner fittings.

SUMMARY OF THE INVENTION

The above-noted problems, and others, are overcome by splicing a band of lighter, more flexible, honeycomb material having the same thickness as the center section and flanges at the sharp corners, so that the entire shroud can be formed from honeycomb materials having uniform thickness. Face sheets cover all of the varying flexibility, uniform thickness honeycomb sections. If desired, pieces or bands of honeycomb material having the same thickness but higher densities than those of the center section and flanges may be spliced into the honeycomb panels to provide local strong areas for the attachment of various fittings or other components. The various honeycomb panel pieces are assembled, shaped and bent as required, then bonded to suitable face sheets in a conventional manner.

BRIEF DESCRIPTION OF THE DRAWING

Details of the invention, and of a preferred embodiment thereof, will be further understood upon reference to the drawing, wherein.

DETAILED DESCRIPTION OF A PREFERRED EMBODIMENT

Figure 1:
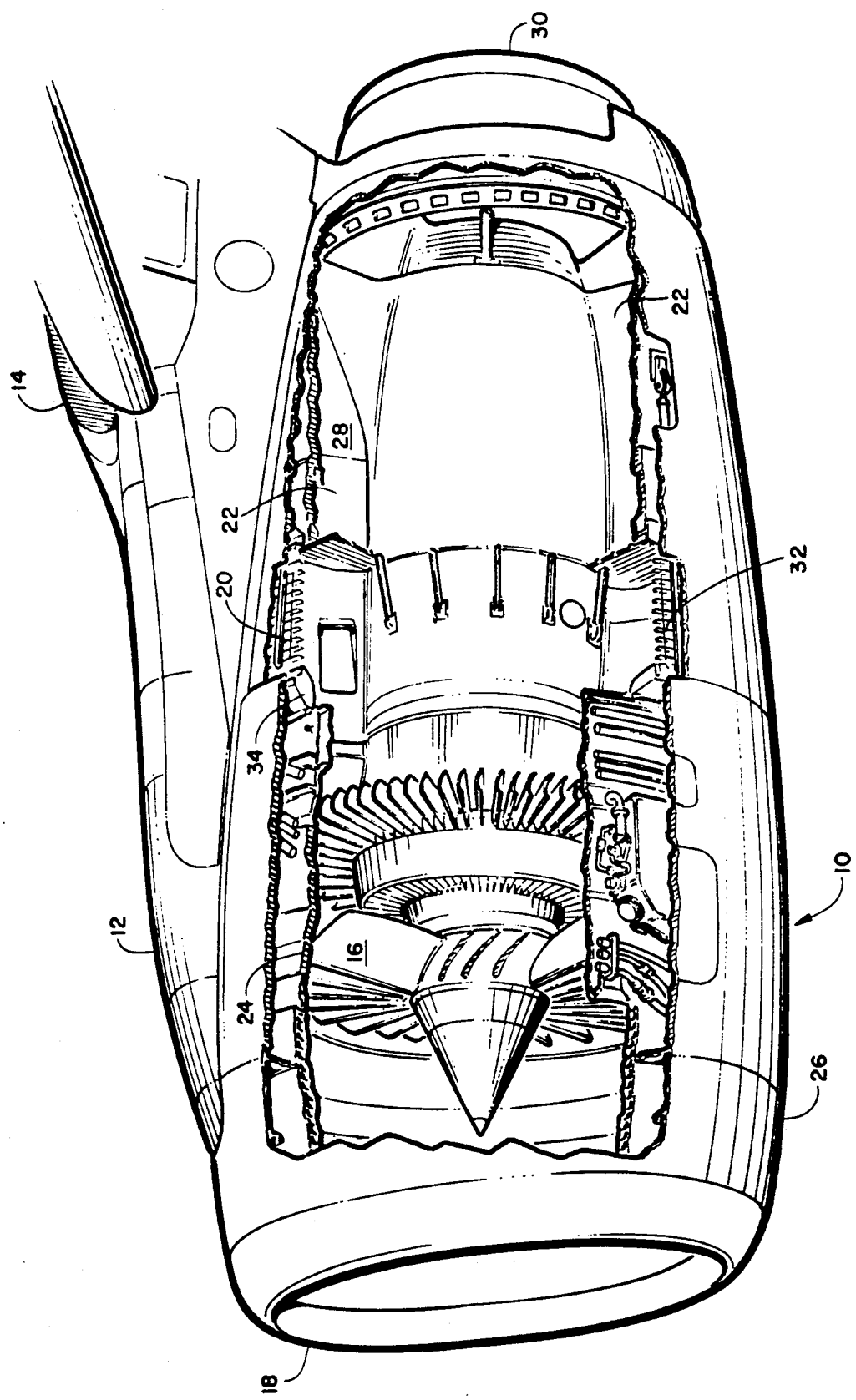
FIG. 1 is a schematic perspective view of fan jet engine, partially cut away to show the improvement of this invention.

Referring now to FIG. 1, there is seen a conventional gas turbine engine 10 of the fan type, mounted by a pylon 12 on an aircraft wing 14. A fan 16 located just within engine inlet 18 is driven by a core engine within engine inner shroud 20. Shroud 20 is ordinarily formed from two approximately "C" shaped halves with edge extensions or flanges 22 which extend to the inner wall of engine casing 24. An annular space lies between shroud 20 and the core engine.

Engine casing 24 within nacelle 26 forms part of the outer wall of a bypass duct 28 between casing 24 and core 20 into and through which fan 16 forces a flow of compressed air. In normal engine operation, the compressed air flows through bypass duct 28 and out engine outlet 30, adding to engine thrust. thrust reversers 32, including turning vane cascades and torque ring mounting assembly 34, are provided to reverse engine thrust during landing.

Figure 2:
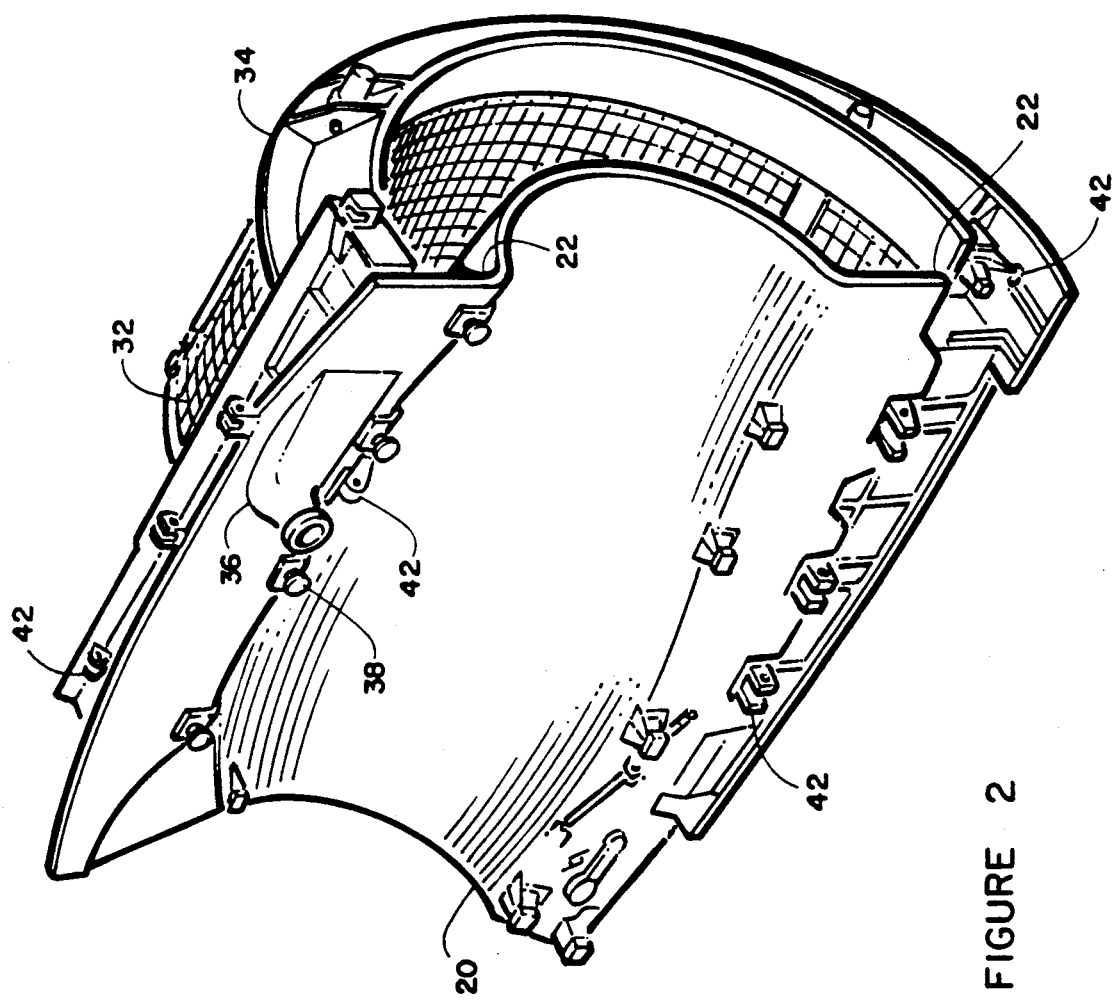
FIG. 2 is a schematic perspective view of one half of an engine shroud.

The left hand half of a typical shroud 20 and nearby portions of the thrust reverser assembly 32 are shown in greater detail in FIG. 2. A variety of components and fittings are typically mounted on or inside the shroud, which when assembled surrounds but is spaced from a conventional engine (not shown). Typical components and fittings include a precooler duct 36, upper and lower bumpers 38 and 40, respectively, various latches 42 for fastening the shroud together and to other structures, etc.

Shroud 20 and flanges 22 are generally formed from a conventionally manufactured panel comprising a honeycomb core with two continuous face sheets bonded thereto. Typically, the honeycomb core and face sheets may be metal such as aluminum or titanium or a fiber reinforced composite, such as graphite fibers in an epoxy matrix. While the honeycomb cores can be reshaped into shapes having relatively wide curves, sharp corners cannot be formed in panels having the thicknesses suitable for use in shroud engine shrouds without damaging the panel in the corner regions.

Figure 3:
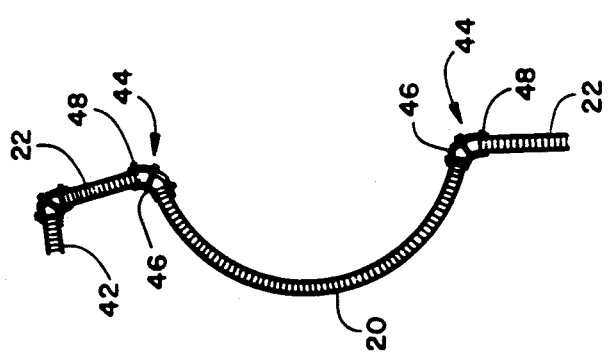
FIG. 3 is a schematic transverse section view through a prior art shroud.

The prior art method for manufacturing engine shrouds of the sort shown in FIG. 2 is illustrated in transverse section in FIG. 3. The widely curved shroud center section 20 is fabricated from a honeycomb panel manufactored by conventional methods as noted above. Separate pieces of honeycomb are cut for flanges 22, including any further extensions 42 as may be desired. The honeycomb structure is schematically represented by the parallel lines lying perpendicular to the face sheets in FIGS. 3 and 4. Corner fittings 44, which include splice plates 46 and bolts or rivets 48 are attached to the abutting honeycomb pieces along each intersection. In order to securely fasten bolts 48 to the honeycomb material, which does not have great localized strength, it is necessary to fill the honeycomb cells in the region of the bolt with a potting material, typically a synthetic resin or to emplace inserts of greater density. The shape of the plates 46 must be carefully designed for each corner. Thus, it is apparent that these corner fittings 44 are heavy, expensive, difficult to fabricate and will tend to have less than ideal reliability.

Figure 5:
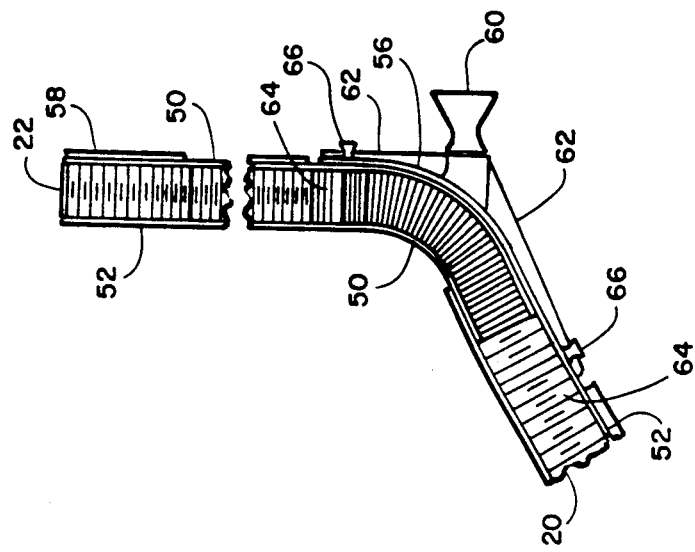
FIG. 5 is a detail transverse section view through a shroud corner fabricated according to this invention.
Figure 4:
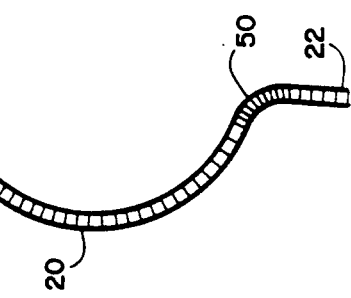
FIG. 4 is a schematic transverse section view through the shroud of this invention.

My improved integral corner structure is best seen in FIGS. 4 and 5. The shroud is formed from a honeycomb core with face sheets bonded to both surfaces. I have found that the need for complex corner fittings 44 can be eliminated and an integral honeycomb shroud can be fabricated by first shaping the flanges 22 and 42 and center section 20, leaving gaps at the corners. Pieces of lower density, flexible, honeycomb core material 50 are shaped to fill the gaps. These pieces are placed in the gaps and face sheets 52 are applied and bonded in a conventional manner. Face sheets 52 may overlap if desired, as shown at 54, or may be doubled around a corner as shown at 54, or may be doubled around a corner as shown at 56 to provide added local increases in strength if desired. Heat resistant layers may also be applied to areas subjected to high temperatures if desired, as indicated at 58.

Where fittings such as bumper 60 on bracket 62 are to be affixed to the shroud as shown in FIG. 5, pieces of high density, high strength honeycomb 64 may be spliced into the basic honeycomb panel. Or, the honeycomb in those areas could be filled with potting material or other materials to provide mountings for fasteners 66 having sufficient strength.

This system provides a simple, reliable shroud having a substantially uniform thickness and uniformly covered with face sheets to provide a versatile light weight structure having strength optimized for the requirements of different areas.

While certain specific materials, dimensions and methods were detailed in the above description of preferred embodiments, those can be varied, where suitable, with similar results.

I claim:

1. In a gas turbine engine of the type having a core engine, a shroud surrounding the core engine, a tubular outer nacelle defining an annular bypass duct therebetween and a fan disposed in the nacelle inlet for directing compressed gas flow into and through said bypass duct, said shroud formed in two. axially divided halves, each having a generally semicircular cross-section center portion with radially extending flanges secured to the axial edges of said center section; the improvement wherein:

each shroud half comprises an integral panel having a honeycomb core of substantially uniform thickness and continuous facesheets bonded to both core surfaces, the honeycomb core in corner regions having lower density and greater flexibility than the honeycomb core in the balance of the shroud.

2. The improvement according to claim 1 further including an additional face sheet material covering selected corner areas.

3. The improvement according to claim 1 further including in said core regions of higher density, higher strength, honeycomb core material to receive fasteners foraccessory components.

* * * * *